United States Patent
Dardalis (10) Patent No.: US 10,563,509 B2
(45) Date of Patent: Feb. 18, 2020

(54) METHOD AND APPARATUS FOR ROTATING SLEEVE ENGINE HYDRODYNAMIC SEAL

(71) Applicant: Dimitrios Dardalis, Austin, TX (US)

(72) Inventor: Dimitrios Dardalis, Austin, TX (US)

( * ) Notice: Subject to any disclaimer, the term of this patent is extended or adjusted under 35 U.S.C. 154(b) by 0 days.

(21) Appl. No.: 14/392,018

(22) PCT Filed: Apr. 4, 2013

(86) PCT No.: PCT/US2013/035306
§ 371 (c)(1),
(2) Date: Feb. 2, 2015

(87) PCT Pub. No.: WO2013/152214
PCT Pub. Date: Oct. 10, 2013

(65) Prior Publication Data
US 2015/0361838 A1 Dec. 17, 2015

(51) Int. Cl.
*F16J 15/34* (2006.01)
*F01B 15/00* (2006.01)
*F01L 1/46* (2006.01)

(52) U.S. Cl.
CPC .............. *F01B 15/007* (2013.01); *F01L 1/46* (2013.01); *F16J 15/3404* (2013.01); *F16J 15/3448* (2013.01)

(58) Field of Classification Search
CPC ............................ F16J 15/3244; F16J 15/3404
See application file for complete search history.

(56) References Cited

U.S. PATENT DOCUMENTS

| | | | | |
|---|---|---|---|---|
| 3,761,150 A | * | 9/1973 | Linda ...................... | F16C 35/10 384/125 |
| 3,804,424 A | * | 4/1974 | Gardner ............... | F16J 15/3412 277/360 |
| 5,169,159 A | * | 12/1992 | Pope ...................... | F16J 15/441 277/422 |
| 5,755,445 A | * | 5/1998 | Arora .................... | F01D 11/005 277/418 |
| 6,086,345 A | * | 7/2000 | Acharya ................. | F01C 1/088 418/135 |
| 2004/0256809 A1 | * | 12/2004 | Dardalis ............... | F01B 15/007 277/399 |

(Continued)

Primary Examiner — Kristina R Fulton
Assistant Examiner — L. Susmitha Koneru
(74) Attorney, Agent, or Firm — Slayden Grubert Beard PLLC (57) ABSTRACT

An improved sealing system for a poppet valve rotating sleeve internal combustion engine with rotating liners. A hydrodynamic face seal assembly includes a spring pre-load assembly provides a uniform loading to a primary sealing ring. A secondary seal is provided between the primary sealing ring and the cylinder head. Hydrodynamic face seal features are provided either on the mating face of the primary sealing ring or on the annular face of the rotating liner. The hydrodynamic face seal features include an inner sealing zone, and an outer loading zone with a plurality of hydrodynamic lift pads, and dam features which create converging surfaces. A lubricant is provided to the annular face of the rotating liner, so that a lubricant layer can be maintained between the primary sealing ring mating face and the rotating liner.

20 Claims, 10 Drawing Sheets

(56) References Cited

U.S. PATENT DOCUMENTS

2010/0164183 A1* 7/2010 Berard .................. F16J 15/442
                                                        277/544
2010/0244390 A1* 9/2010 Berdichevsky ........ F16J 15/322
                                                        277/568

* cited by examiner

Figure 1 (PRIOR ART). Old Heavy Duty face seal design.

METHOD AND APPARATUS FOR ROTATING SLEEVE ENGINE HYDRODYNAMIC SEAL

RELATED APPLICATIONS

This patent application is related to U.S. Provisional Patent Application No. 61/620,395 filed by applicant on Apr. 4, 2012, and claims the benefit of that filing date.

BACKGROUND

Field of Invention

This invention relates to a method and apparatus for a hydrodynamic face seal between a rotating cylinder liner and a cylinder head in an internal combustion engine.

Prior Art

This patent describes improved sealing methods and mechanisms between the cylinder liner and the cylinder head of a rotating sleeve engine, also named a rotating liner engine (RLE). In a conventional engine, a seal between the cylinder head and stationary cylinder is typically obtained by compressing a head gasket between the head and the cylinder. Since the RLE has a rotating liner, an alternate means of sealing between the block and the liner is required.

U.S. Pat. No. 6,289,872 for "Rotating sleeve engine" and U.S. Pat. No. 7,004,119 for "Apparatus and method for rotating sleeve engine hydrodynamic seal", both by applicant, are incorporated by reference.

Prior Art Face Seal Design

Figure 1:
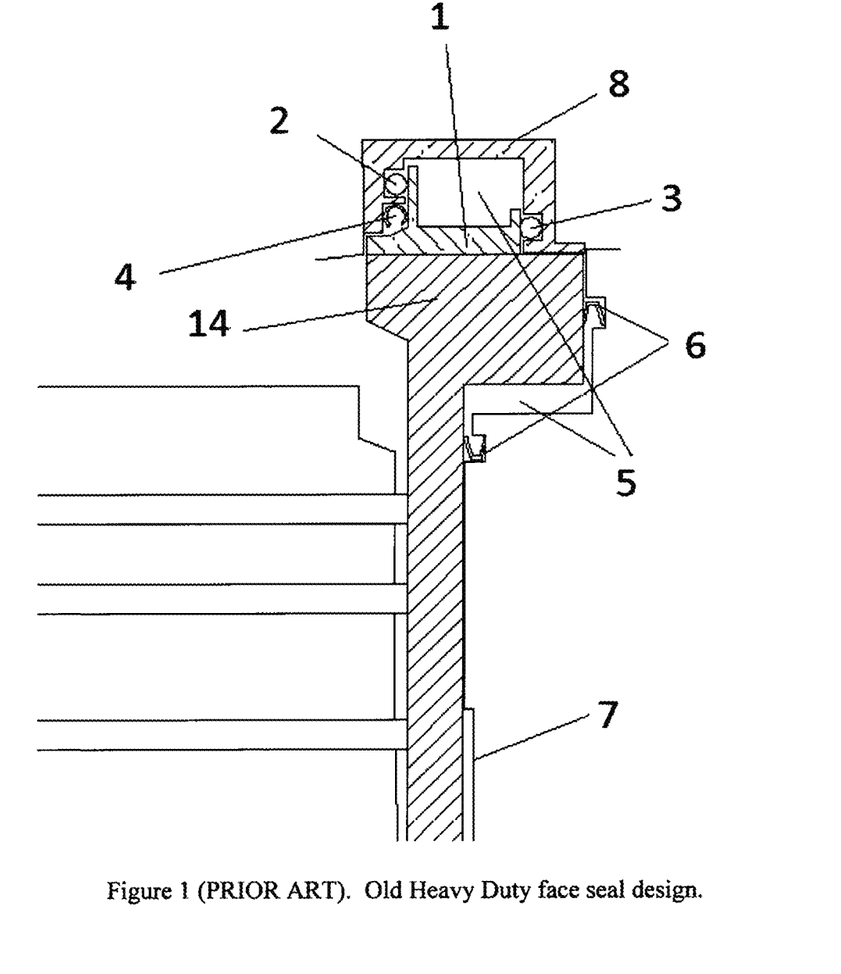
FIG. 1 shows a prior art RLE face seal of U.S. Pat. No. 7,004,119.

FIG. 1 shows a prior art RLE face seal of U.S. Pat. No. 7,004,119.

The schematic of FIG. 1 shows the major elements of the prior design, many of which are maintained in the current invention. The elements that are maintained are the hydrostatic instead of hydrodynamic rotating liner thrust bearings. As described more fully in the '119 patent, the oil leap seals 6 define the area where high pressure oil is pumped 5 and generates upward axial forces on the liner flange. This characteristic eliminates the need of a high tolerance hydrodynamic thrust bearing on the bottom of the liner. This upward force is slightly higher than the downward pre-load force on the primary sealing ring, and the difference is absorbed by the thrust bearing formed by the interface of the head insert and the rotating liner.

The prior design also has a region of high pressure oil on the upper side of the primary sealing ring 1, as described by the '119 patent. This region ensures a uniform pre-load on the seal. For example, if we use a number of coil springs to generate the pre-load as is often the case with face seals, the fact that our primary seal is very thin, and the fact that we need a relatively high pre-load of at least 200,000 Pa (30 lb/in$^2$) in order to accomplish good oil control, the result will be that there would be excessive load in the regions where the coil springs act, and very little in other areas. The load is supported by the hydrodynamic step pads which are evenly distributed on the face. The result would have been that only a few of our pads would be loaded (the ones directly below a coil spring). Another option would be to use a very large number of coil springs, but that would make the design expensive and assembly expensive and easy to make mistakes (i.e., a coil spring could fall off position). In order to avoid this event, the design of FIG. 1 has primary seal pre-load generated by oil pressure, which is pumped into the head insert 8 by the oil pump via passages through the cylinder head.

This design however generates the following problem. It was found through experimentation that if we used one O-ring secondary seal as in embodiment "Light Duty" of U.S. Pat. No. 7,004,119, we have oil pumped into the cylinder by the nature of variable pressure which rhythmically deforms the O-ring. That forced us to use two secondary seals, one to deal with the gas pressure (the lower one which is shown as non-polymer based secondary seal), and one 4 to deal with the oil pressure. This generates a few problems. First, the space between the two seals needed to be vented. This is necessary because if any pressure builds up in that region, it can adversely affect the moment balance of the seal (elaborately described in U.S. Pat. No. 7,004,119, SAE 2005-01-1653, and Dimitrios Dardalis' PhD thesis "A Unique Hydrodynamic Face Seal for the Rotating Liner Engine, and the Rotating Liner Engine Face Seal Transient Code", Ph.D. Dissertation, UT Austin 2003). This can be done by venting in the coolant space or in the exhaust or intake port. But neither of these are easy to apply in production. The other problem is that the seal itself needs to be relatively long axially, which makes it somewhat troublesome to be packaged in an existing cylinder head. The third problem is that the multiple oil seals used, especially O-rings 2 and 3 of FIG. 1, can generate significant axial and radial loads with can interfere with the very subtle force and moment balance of the face seal.

SUMMARY OF INVENTION

A rotating liner engine comprises a plurality of cylinders where each cylinder has a piston and a head. As more fully described in U.S. Pat. Nos. 6,289,872 and 7,004,119, engine friction is reduced by rotating a liner so that piston ring friction is significantly reduced.

In one embodiment, an improved sealing system comprises a hydrodynamic face seal assembly where the friction between the mating face of a primary sealing ring and the top annular face of the rotating liner is reduced by hydrodynamic face seal features including a plurality of lift pads with dam features. The dam features may comprise an inner dam, an outer dam, or both an inner and an outer dam. In one example the hydrodynamic face seal features are provided on the rotating liner top annular face. In another example the hydrodynamic face seal features are provided on the mating face of the primary sealing ring. A method of manufacturing hydrodynamic face seal features comprises providing a masking shim which exposes the lift pads for etching or sand-blasting.

In one embodiment, the prior art hydraulic pre-loading, via oil pressure, of the primary sealing ring is replaced by a mechanical spring pre-load assembly. In one example, the mechanical spring pre-load assembly comprises a spring washer, a spring fulcrum, and a spring base.

DETAILED DESCRIPTION OF EMBODIMENT

Figure 2:
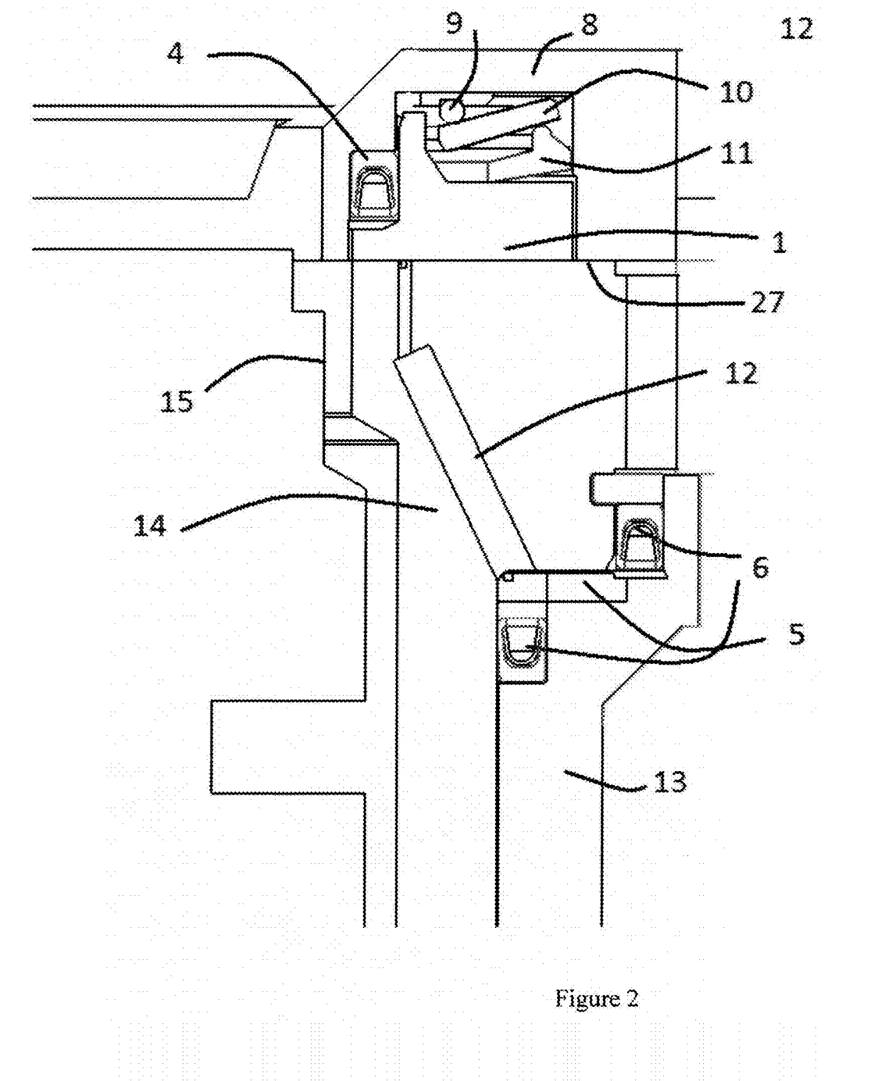
FIG. 2 is a cross section view of an embodiment of a face seal where the mechanical pre-load is via a flat washer that turns conical under assembly.

The following element numbers are provided for convenience in reviewing the figures.
Rotating liner Engine components
Stationary Liner 13
Outline of block's stationary liner 7
Rotating Liner 14
Piston surface 15
Cylinder head insert 8
face 27 thrust bearing area
rotating liner drive elements
Driving Gear 22
90-degree gearbox 23
Extension Shaft 24
Accessory Pulley 25
Driving Gear cover 26
sealing system
hydrodynamic face seal assembly 35
primary sealing ring 1
mating face 34,
pre-load assembly 30
spring Fulcrum 9
spring Washer 10
spring Base 11
springs 37
secondary seal 44
Prior art secondary sealing system
Inner O-ring 2
Outer O-ring 3
U-cap secondary seal 4
rotating liner annular face (view when primary sealing ring 1, head insert 8, and pre-load mechanism 20 are removed). 32
hydrodynamic face seal features
step pads 17
tilted step pads 40
inner sealing zone 18
outer loading zone 29
dam features
inner peripheral dam 28
outer peripheral dam 20
lubricant supply means
Oil Supply hole 12
Regions of high oil pressure 5
Oil lip seals 6
Annular deep oil supply groove 142
Radial deep oil supply groove 144.
method of manufacturing hydrodynamic face seal features
Raised area of step pad 16
Etched (depressed) area of step pad 17
Outside diameter of primary sealing ring 19
Masking shim 21
Improved Hydrodynamic Face Seal Assembly FIG. 2 shows an embodiment of an improved hydrodynamic face seal assembly.

Mechanical Pre-Load Assembly

In this embodiment, the need for an oil pressure pre-load on the upper part of the primary sealing ring 1 of FIG. 1 is eliminated. Extensive finite element analysis indicates that the elimination of the oil pressure pre-load provides several benefits. It reduces the need for three secondary seals (2, 3, and 4 as shown in FIG. 1) and replaces those three seals them with a single secondary seal 44 as shown in FIG. 2. Also, the need to vent the area between the inboard secondary seals 4 and 2 of FIG. 1 is eliminated. Finally, the axial forces that O-rings 2 and 3 (as shown in FIG. 1) could generate and interfere with the seal function are eliminated.

The improved design also eliminates the need for oil passages in the head to supply the head inserts with oil.

Figure 2A:
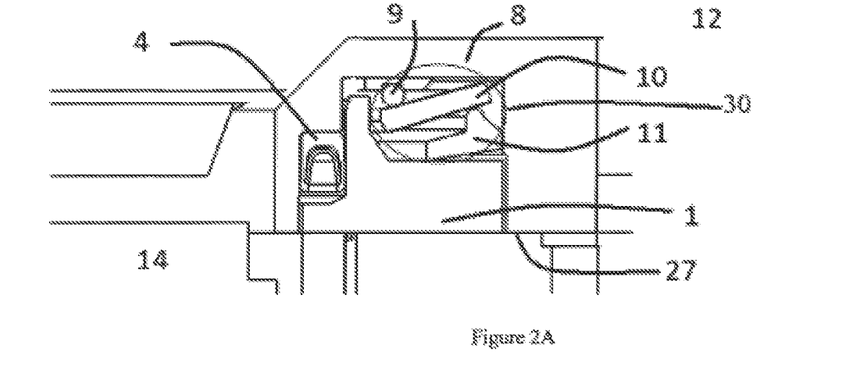
FIG. 2A shows the mechanical pre-load assembly.

In the mechanical pre-load assembly 30 of FIG. 2 and FIG. 2A, a spring washer 10 is used to provide more uniform pre-loading without oil pressure. The spring washer 10 of this embodiment is flat in its unloaded state. During assembly, the spring washer deforms in a conical shape, thus providing the necessary spring load.

In this example mechanical pre-load assembly 30, a round wire is fitted in a groove in the head insert to serve as a spring fulcrum 9, and a spring base 11 deforms elastically the spring washer 10 during assembly, thereby generating the pre-load. In this example, the spring base 11 is also a ring that has two functions. First, it forces the spring washer to deform from its flat shape into the shown conical shape, and generate the axial load applied on the primary sealing ring. Second, it re-routes the force to the correct radius, so that the seal does not tilt under the action of the hydrodynamic load support acting on the primary sealing ring.

This design permits the use of a thin and compliant primary sealing ring. If, for example, the contact between the spring base and primary sealing ring was made too far inwards, the primary sealing ring would tilt "inwards", raising the possibility that the inside edge of the seal would touch the face of the rotating liner, with consequences of wear and increased friction. If the contact was too far outside, the seal would touch outside, while the film thickness in the sealing zone would be too high, which would cause poor oil control and poor gas sealing. The correct radius of contact is determined by the design of the hydrodynamic pads.

Figure 9:
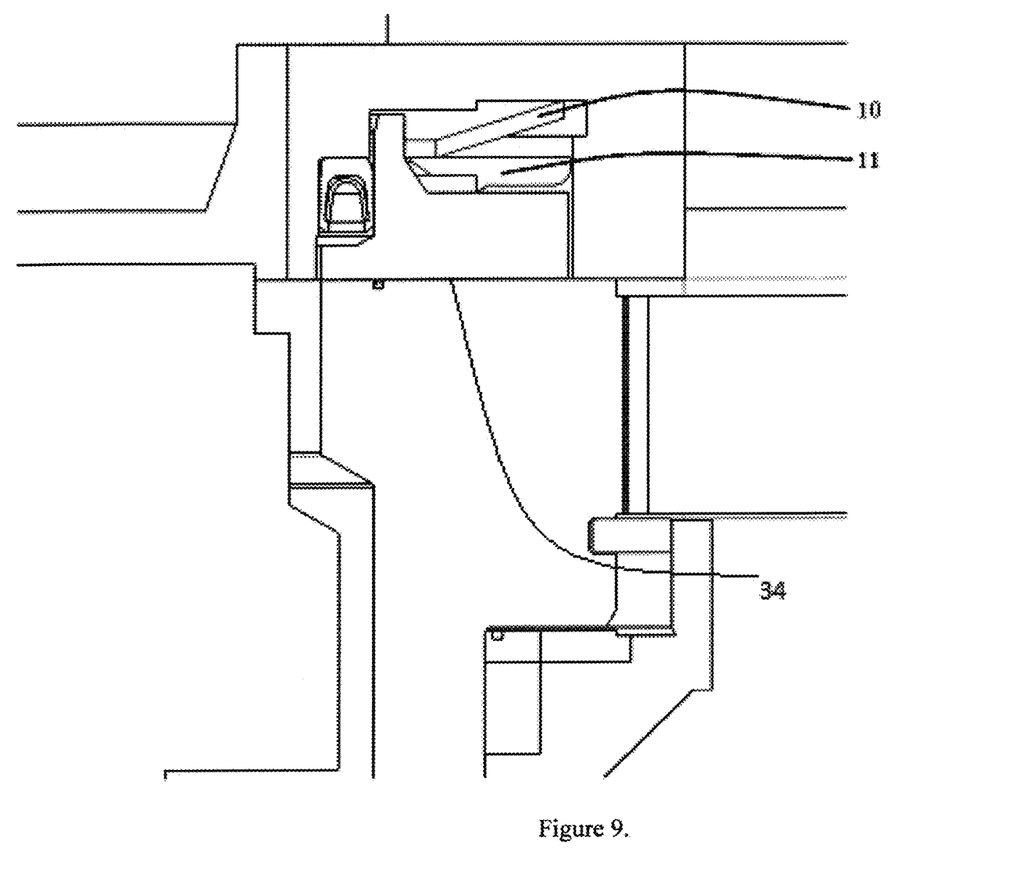
FIG. 9 (similar view to FIG. 2) is a cross section view of an embodiment of a face seal where the mechanical pre-load is via a Belleville washer that gets flatter under assembly.

Another way of designing the face seal spring is via a Belleville washer spring (starts conical shape and flattens up to some extend during assembly) such as shown in FIG. 9.

Figure 6:
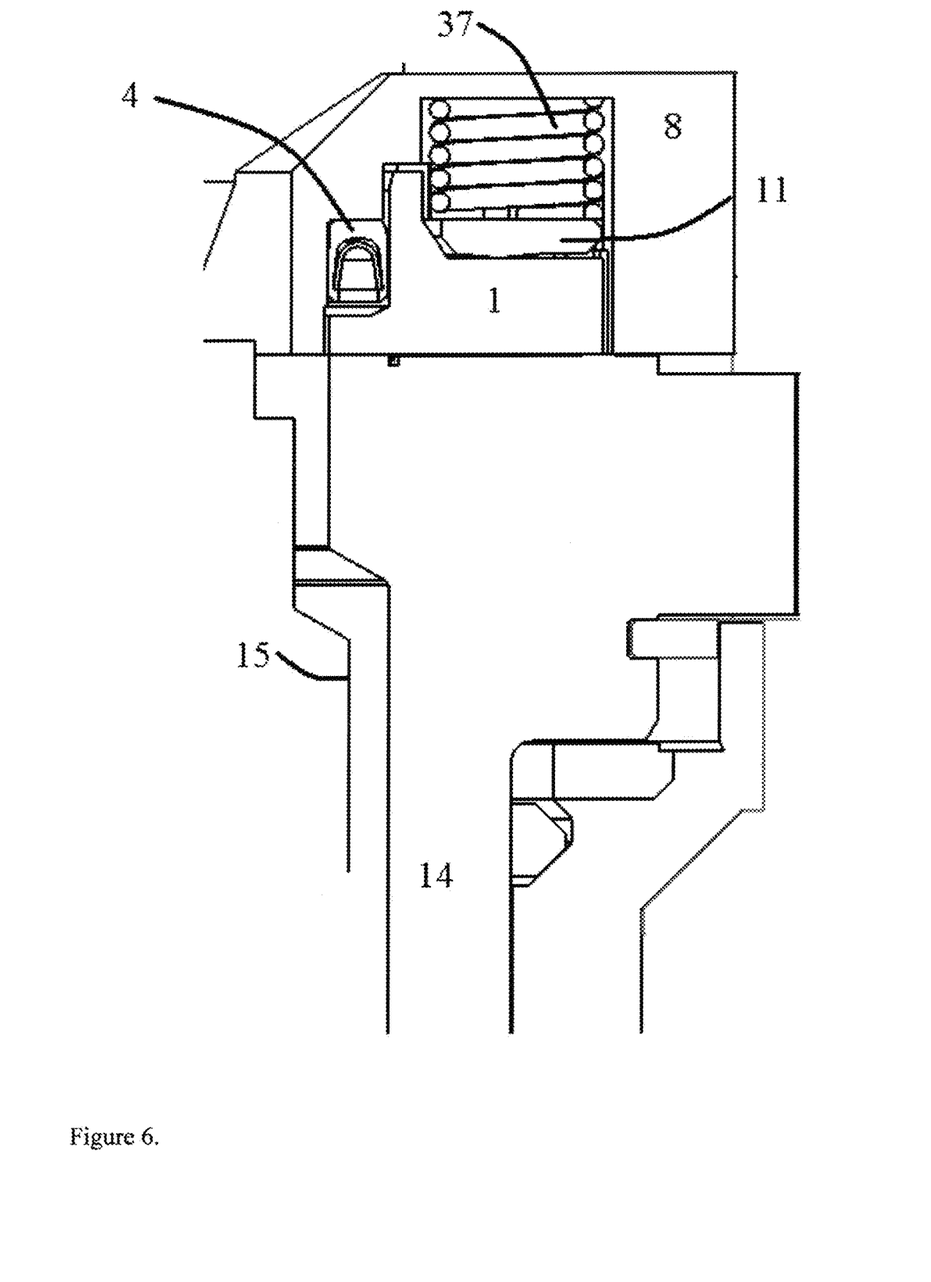
FIG. 6 shows a face seal pre-load mechanical pre-load embodiment using a plurality of coil springs.

A third example of a mechanical pre-load is via conventional coil springs is shown in FIG. 11. In this embodiment, a relatively large number of coil springs 37 are used to minimize the concentrated load. The spring base 11 is still used to apply the spring load force at the correct radius on the face seal. Also, a drawback of this embodiment is that a relatively high axial space is needed, requiring an axially thicker head insert.

We need to ensure that the deflection of the spring under the assembled state is sufficient to generate the load we need without exceeding the yield strength of the component. However, the deflection needs to be high enough, so that the spring force is not very sensitive to the compression of the head gasket. Therefore, we need a total deflection of the order of 0.75 mm-1.5 mm. This way, if there is a 0.025-0.075 mm (0.001-0.003") tolerance in the actual deflection due to head gasket variations, the force will not be greatly affected (note, the head gasket only seals coolant and oil passages, the combustion gas is sealed by the face seal). The variables that the designer controls are the washer thickness, and the radial distance between the spring fulcrum and the outside contact with the spring base.

The reader may wonder that now the load is distributed along a circle on the upper face of the sealing ring. However, it is concentrated along the radial direction. However, analysis indicates that the seal is relatively rigid and resists appreciable deflections long the radial direction. However, it is very compliant in the periphery direction. Therefore, having a distributed spring load along the circular contact patch between the spring base and upper sealing ring works well.

Additional advantages of these spring arrangements is that the axial size can be reduced, as compared to conventional coil springs, and the assembly process is simpler because the parts count is reduced.

In this embodiment, the secondary seal 44 is a Teflon-based seal with a metal spring for pre-load. Those skilled in the art of sealing will recognize the trade name "variseal", which is usually used for both static and dynamic sealing applications (in our case, this is a static application) and is typically a Teflon based U-cap seal energized by a metal spring inside, so that it stays in contact to the gland surfaces when there is no pressure loading. The secondary seal used in this embodiment is very similar to the standard variseal. That is an improvement over polymer O-rings because both the radial forces and axial friction forces are considerably reduced.

Lubrication of the Face Seal

This embodiment has a number of oil supply holes 12 on the rotating liner 14 flange which supply oil to the face seal interface.

Improvements in Face Hydrodynamic Features

This embodiment provides all the hydrodynamic oil flow and hydrodynamic features on the annular face 32 of the rotating liner 14 rather than on the primary sealing ring 1. That allows several advantages. First, the primary sealing ring is very compliant, and therefore any machining done to it could lead to it warping. However, the rotating liner flange is much more rigid and stable component. Also, it allows us to manufacture the primary sealing ring from a softer material. Startup wear will take place on the softer material of the primary sealing ring, leaving the critical features unaltered. Alternate materials include brasses and bronzes. In one embodiment, the primary sealing ring is built out of Beryllium Copper. Certain alloys of this material can have hardness of the order of 40 Rc, yet have thermal conductivity more than twice that of steel. That would ensure very low thermal distortions. Also, the new design packages very well so that it can comfortably fit in existing engines.

Figure 3:
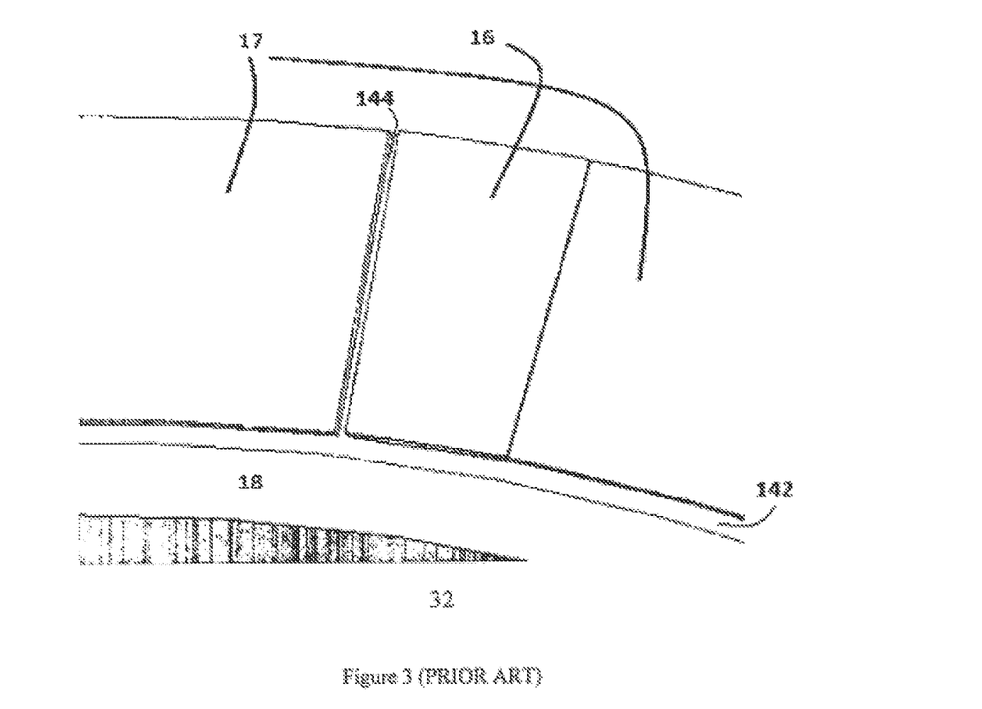
FIG. 3 is a top view of a prior art (FIG. 1) face seal hydrodynamic step pad of U.S. Pat. No. 7,004,119, where the top face of the flange of rotating line 14 is shown with the primary sealing ring 1 and head insert 8 removed.

This paragraph describes the prior art design shown in FIG. 3, as explained in U.S. Pat. No. 7,04,119. The sealing zone 18 is the section of the face 32 is the section inwards of the relatively deep annular groove 142 (deep relatively to the recessed area 17, example the recessed area 17 may be about 5 μm deep, while the groove 142 may be about 100 μm deep). The load support zone is the section outwards of this deep annular grove 142. Radial oil passages 144 (also relatively deep) between the recessed area 17 and radial step pads 16 transport the lubricant outwards. Radial hydrodynamic step pads 16, which are raised compared to the recessed areas 17 but identical level to sealing zone 18 provide "step pad" hydrodynamic features. Lubricant is supplied under pressure in annular groove 142 and after spreading in the peripheral direction it exits through radial grooves 144, while lubricating the recessed areas 17 and radial step pads 16, and provide some lubricant on the sealing zone 18 which helps contain the combustion gases.

This prior art design has one main limitation. The squeeze film plays a relatively large factor in the moment balance of the seal as described in detail in U.S. Pat. No. 7,004,119, SAE paper 2005-01-1653, and Dimitrios Dardalis' PhD thesis "A Unique Hydrodynamic Face Seal for the Rotating Liner Engine, and the Rotating Liner Engine Face Seal Transient Code", Ph.D. Dissertation, UT Austin 2003). That happens because the sealing zone 18 tends to dominate with the generation of squeeze film action on the inside edge of the face seal, but there is little squeeze film generation in the load support area of the seal (see U.S. Pat. No. 7,004,119 for definitions of sealing zone and load support zone). However, the squeeze film factor cannot be easily controlled by the seal designer. The squeeze film factor depends a lot on engine speed (i.e., duration of the high pressure part of the cycle) and engine load. Therefore, while the designer is trying to generate a hydrodynamic feature design and seal cross section that satisfies all conditions, he learns that for certain cases (i.e., high crankshaft speeds) the squeeze film factor can be too large, allowing the inside part of the seal to stay at high film thickness (poor sealing) while the outside of the seal may have very low film thickness (contact). The designer can attempt to deal with this condition by reducing the side area that the primary sealing ring is exposed to gas pressure, and thus change the moment balance so that the sealing zone is more loaded. However, that might not satisfy other operating conditions. Under different conditions (low crankshaft speeds) where squeeze film conditions are low, the inside of the seal could loose too much film thickness and suffer contact. This new feature has also been in detail explained in SAE paper 2012-01-1963.

Figure 4:
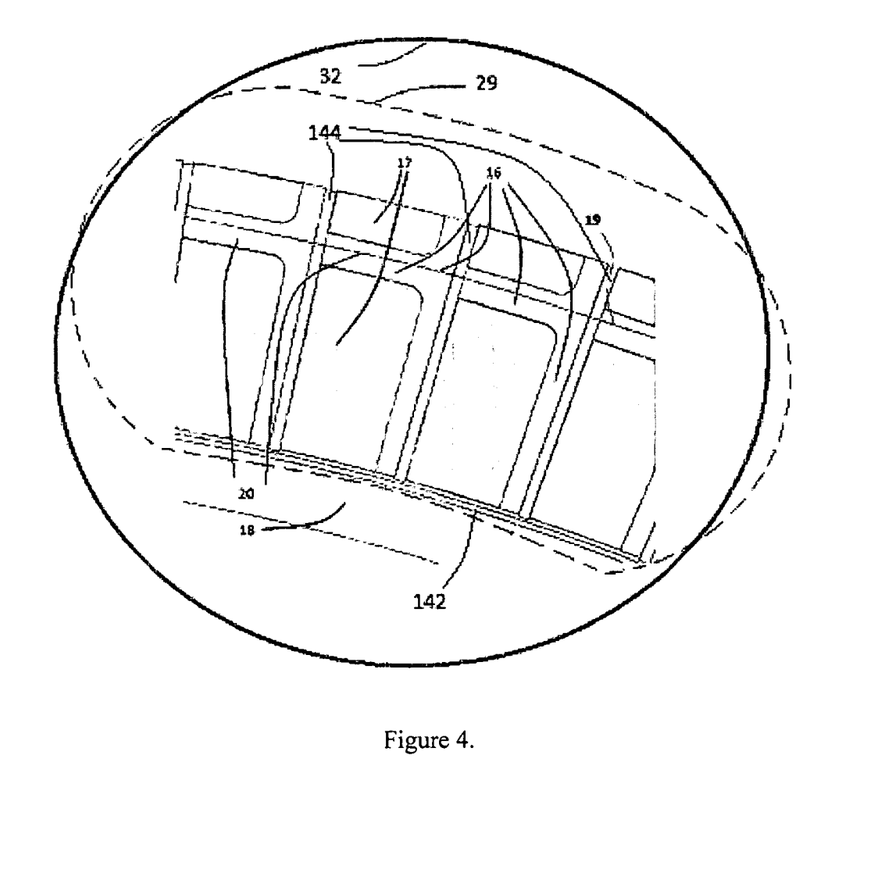
FIG. 4 is a top view of improved hydrodynamic step pads incorporating an outside dam, where again the top face of the flange of rotating liner 14 is shown with the primary sealing ring 1, head insert 8, and preload assembly 30 of FIG. 2 removed.

FIG. 4 shows improved hydrodynamic face seal features on face 32 of the interface between the rotating liner 14 and primary sealing ring 1 incorporating an example "outside dam". In this embodiment, a hydrodynamic outside dam 20, which unlike the radial dam 16 (also referred to as step pad) it extends in the peripheral direction, generates squeeze film action on the outside of the dam of about the same degree as the sealing zone 18. The load support zone 29 is defined as the area outside of the annular oil supply groove 142. Also, the squeeze film action is applied to the very outside of the seal face, so it contributes sufficiently to the moment balance so that all engine operating conditions can be satisfied with a good radial distribution of film thickness. As a side benefit, the outside dam 20 minimizes side leakage and increases the load capacity of the load support zone of the seal. That allows a less wide rotating liner flange to be designed, which makes it easier to package the rotating liner design without modifying the engine block or increase bore spacing. Also, in FIG. 4 the outline of the outside diameter of the seal within the rotating flange 19 is shown. That indicates that a small portion of the dam is used for the thrust bearing area of the rotating liner (located at face 27 of head insert 8), which is the flange portion lying outside the OD of the primary sealing ring 19. This portion of the dam also increases the load capacity of the thrust bearing, also allowing the rotating liner flange to be smaller and fit in existing engine designs.

Figure 10:
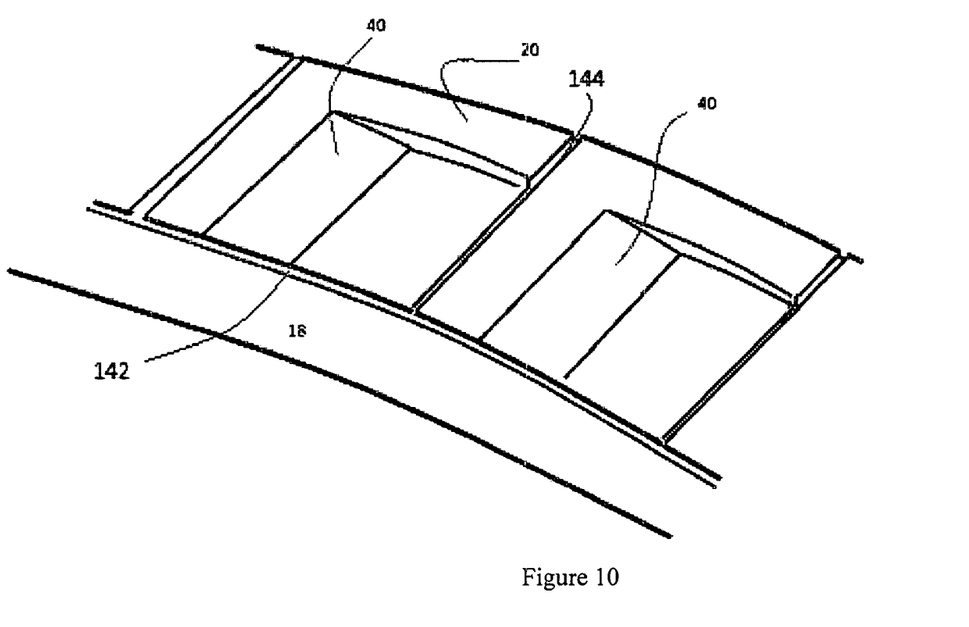
FIG. 10 is a top view of improved hydrodynamic tilted step pads incorporating an outside dam.

FIG. 10 is a top view of improved hydrodynamic tilted step pads 40 incorporating an outside dam 20.

Figure 7:
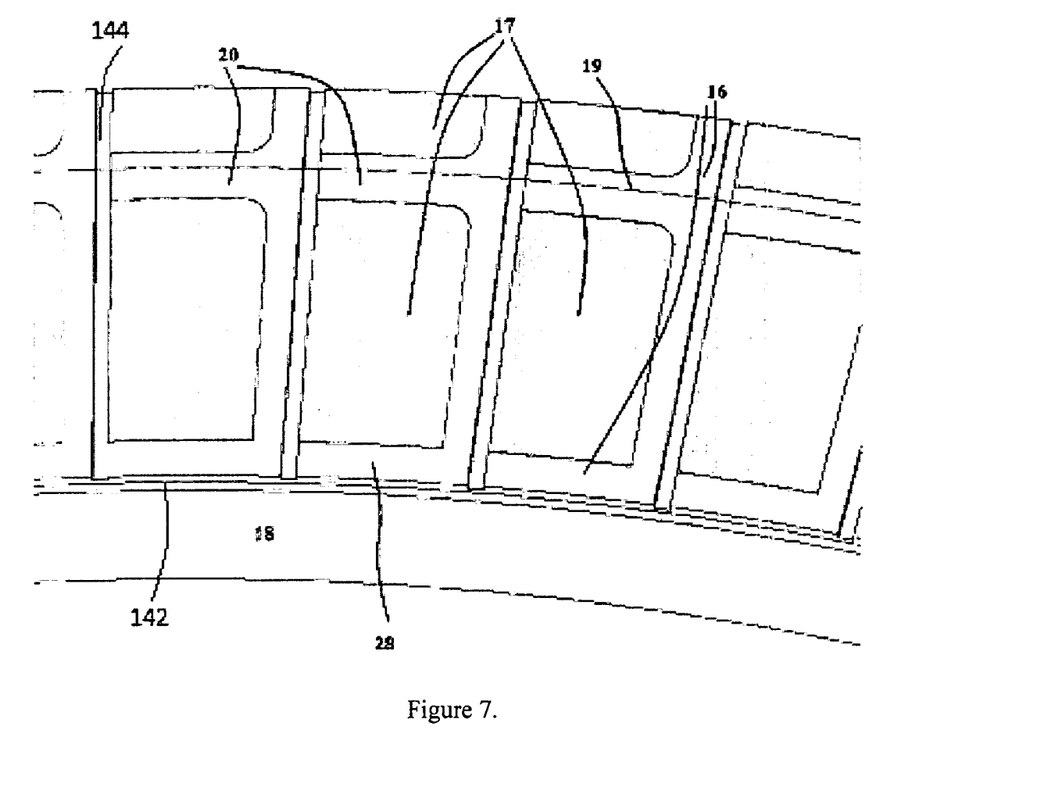
FIG. 7 is a top view (similar view to FIG. 4) of improved hydrodynamic step pads incorporation an outside and inside peripheral dam.
Figure 8:
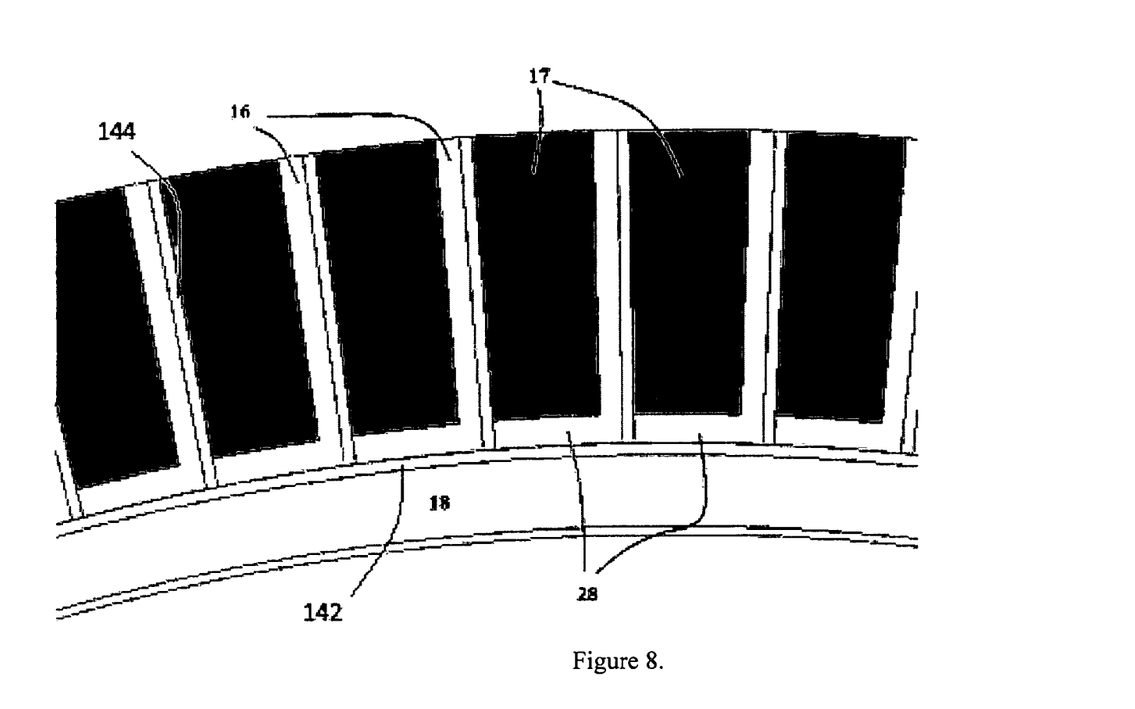
FIG. 8 is a top view (similar view to FIG. 4) of improved hydrodynamic step pads incorporation an inside peripheral dam.

FIG. 7 shows a step pad feature with an inside peripheral dam, 28 as well as an outside peripheral dam 20. FIG. 8 shows a step pad feature with an inside peripheral dam only.

In this embodiment, the hydrodynamic face seal features are provided on the top of the rotating liner 14. In other embodiments, the hydrodynamic face seal features are provided on the on the mating face 34 of the primary sealing ring 1.

Improvements in Fabrication Methods

The rotating liner is the most critical component to fabricate for the RLE. In this embodiment, the rotating liner is built with a heat-treatable steel alloy. Preferably, a through heat treatment will be applied, raising the hardness of the steel in the order of 55 Rc. The part will be rough machined to about 1.0 mm (0.040") larger dimensions from final size. In other embodiments, the rotating liner will be molded at this shape, which may allow us to have the flange holes as part of the casting. However, the OD of the rotating liner that engages the stationary liner bearings, and the flange top, should be under very good perpendicularity. In order to accomplish that, the part will be built as follows. The ID of the liner is finished machined and honed (post heat treatment). Then, the OD of the liner and top face are grinded or machined in the same setup. The lapping on the face will act in an axisymmetric fashion and will not alter the perpendicularity.

Figure 5:
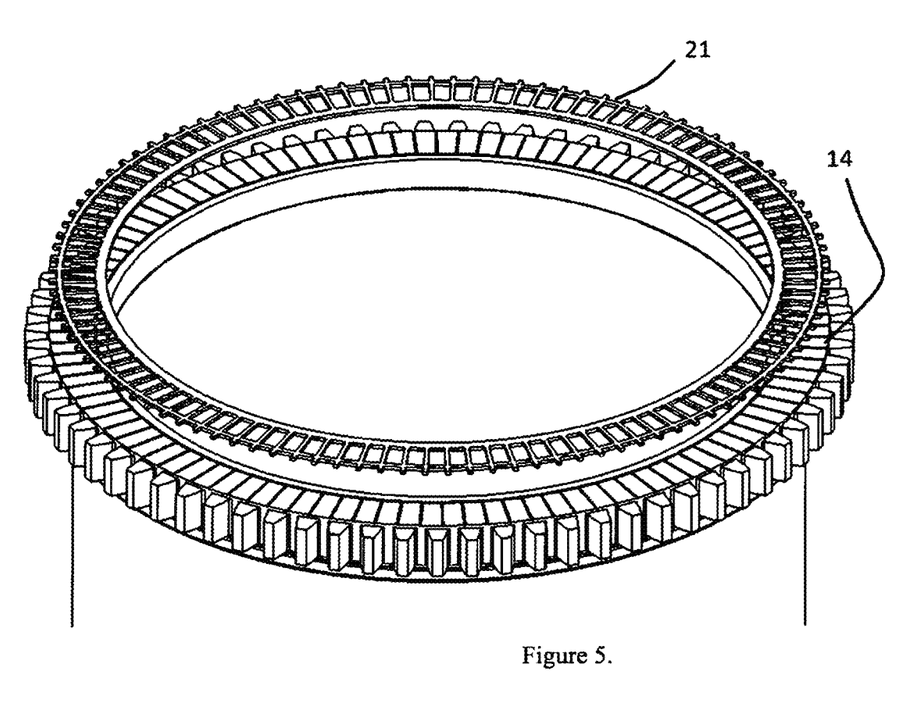
FIG. 5 is a top perspective view of a manufacturing method for generating shallow step pads on the hard face of the rotating liner 14.

The step pads of the rotating liner face are very shallow (of the order of 5 micrometers or 200 micro-inches) and are very difficult to machine with conventional machining methods. Part of the difficulty also arises from the fact that the hardness of the face is very high in order to minimize start up wear and maintain the high degree of polish. One relatively easy method to manufacture the step pads is via chemical etching or sandblasting. One such approach is illustrated in FIG. 5, where the shim 21 has been carefully cut at the right shape and is about to be attached on the face of the liner, with proper alignment. The piece of sheet metal shim 21, possibly steel or brass, is cut to the shape of the areas that will not be etched/sandblasted, exposing the areas of the face that are etched/sandblasted. The shim 21 is held with an easily removable glue (and water proof if this is done by etching). The shim is attached after the radial and annular oil grooves have been machined, and after a preliminary lapping process. The advantage of the etching or sand blasting method is that a tiny amount of material can be removed consistently on the unmasked areas, despite the very high hardness of the metal. If the etching has removed too much material, a measurement of the step pad and additional lapping will bring the depth to the required depth.

It is to be understood that the specific embodiments and examples described above are by way of illustration, and not limitation. Various modifications may be made by one of ordinary skill, and the scope of the invention is as defined in the appended claims.

What is claimed is:

1. A sealing system for a poppet valve rotating sleeve internal combustion engine, the engine comprising a rotating liner which may be rotated during the operation of the engine, and a cylinder head, the improved sealing system comprising
a hydrodynamic face seal assembly comprising
a primary sealing ring comprising a mating face,
a pre-load assembly which provides a uniform loading to the primary sealing ring, and
a secondary seal between the primary sealing ring and the cylinder head, wherein the secondary seal is the only seal positioned between the primary sealing ring and the cylinder head;
an annular face of the rotating liner positioned in proximity to the mating face of the primary sealing ring;
hydrodynamic face seal features provided on the mating face of the primary sealing ring or provided on the annular face of the rotating liner, the hydrodynamic face seal features comprising
an inner sealing zone, and
an outer loading zone, such that the loading zone comprises
a plurality of hydrodynamic tilted pads or step pads, and
dam features, such that the tilted pads or step pads create converging surfaces, and tilted pad or step pad performance is enhanced by the dam features when cylinder pressure rate of change is high; and
at least one lubricant supply hole extending through the rotating liner from a region of high pressure to the annular face of the rotating liner, and such that a lubricant layer can be maintained between the face and the rotating liner.

2. The sealing system of claim 1 wherein the pre-load assembly is a mechanical pre-load assembly comprising
a spring washer;
a spring fulcrum; and
a spring base.

3. The sealing system of claim 2 wherein the spring washer is flat but deforms into a conical shape during assembly.

4. The sealing system of claim 2 wherein the spring washer is deformable into a less conical shape during assembly.

5. The sealing system of claim 1 wherein the secondary seal further comprises a polymer seal.

6. The sealing system of claim 5 wherein the secondary seal is a Teflon-based material.

7. The sealing system of claim 1 wherein the primary sealing ring is a brass material.

8. The sealing system of claim 1 wherein the primary sealing ring is a beryllium copper material.

9. The sealing system of claim 1 wherein the hydrodynamic face seal features further comprise an inside dam.

10. The sealing system of claim 1 wherein the hydrodynamic face seal features further comprise an outside dam.

11. The sealing system of claim 1 wherein the hydrodynamic face seal features further comprise an inside and an outside dam.

12. A method for sealing for a poppet valve rotating sleeve internal combustion engine, the engine comprising a rotating liner which may be rotated during the operation of the engine, and a cylinder head, the method comprising
providing a rotating liner engine with an improved sealing system comprising
a hydrodynamic face seal assembly comprising
a primary sealing ring 1 comprising a mating face,
a pre-load assembly which provides a uniform loading to the primary sealing ring, and a secondary seal between the primary sealing ring and the cylinder head, wherein the secondary seal is the only seal positioned between the primary sealing ring and the cylinder head, and an annular face of the rotating liner positioned in proximity to the mating face of the primary sealing ring;

providing hydrodynamic face seal features on either the mating face of the primary sealing ring or on the annular face of the rotating liner, the hydrodynamic face seal features comprising an inner sealing zone, and an outer loading zone, such that the loading zone comprises an outer loading zone, such that the loading zone comprises a plurality of hydrodynamic tilted pads or step pads, and dam features, such that the tilted pads or step pads create converging surfaces, and tilted pad or step pad performance is enhanced by the dam features when cylinder pressure rate of change is high; and generating, with the pre-load assembly, a pre-load on the primary sealing ring; and providing lubrication to the annular face of the rotating liner via at least one hole extending through the rotating liner from a region of high pressure to the annular face, and such that a lubricant layer can be maintained between the mating face and the rotating liner annular face, such that the dam features reduce lubricant side leakage and therefore enhance the load support of the step pad features, and provide added support under squeeze film lubrication.

13. The sealing method of claim 12 wherein providing a pre-load assembly further comprises providing a spring washer, a spring fulcrum; and a spring base, such that the spring washer applies a uniform load to the spring base and to the mating face of the primary sealing ring.

14. The sealing method of claim 13 wherein providing a washer further comprises providing a flat washer.

15. The sealing method of claim 13 wherein providing a washer further comprises providing a Bellville washer.

16. The sealing method of claim 12 wherein providing dam features further comprises providing outside dams relative to the lift pads.

17. The sealing method of claim 12 wherein providing dam features further comprises providing inside dams relative to the lift pads.

18. The sealing method of claim 12 wherein providing dam features further comprises providing inside dams and outside dams relative to the lift pads.

19. A poppet valve rotating sleeve internal combustion engine, the engine comprising:

a rotating liner that is rotatable during the operation of the engine, a piston positioned for translational motion within the rotating liner, a cylinder head, and a sealing system for sealing the cylinder head and the rotating liner comprising a hydrodynamic face seal assembly comprising a primary sealing ring comprising a mating face, a pre-load assembly which provides a uniform loading to the primary sealing ring, and a secondary seal between the primary sealing ring and the cylinder head, w herein the secondary seal is the only seal positioned between the primary sealing ring and the cylinder head;

an annular face of the rotating liner positioned in proximity to the mating face of the primary sealing ring;

hydrodynamic face seal features provided on the mating face of the primary sealing ring or provided on the annular face of the rotating liner, the hydrodynamic face seal features comprising an inner sealing zone, and an outer loading zone, such that the loading zone comprises a plurality of hydrodynamic tilted pads or step pads, and dam features, such that the tilted pads or step pads create converging surfaces, and tilted pad or step pad performance is enhanced by the dam features when cylinder pressure rate of change is high, wherein the dam features comprise an outside dam at the outside of the step pad; and at least one lubricant supply for maintaining a lubricant layer between the face and the rotating liner.

20. The poppet valve rotating sleeve internal combustion engine of claim 19, wherein the outside dam generates squeeze film action on the outside of the dam at about the same degree as the inner sealing zone, and the dam features further comprise an inside dam at the inside of the step pad.

* * * * *